United States Patent Office 3,463,031
Patented Aug. 26, 1969

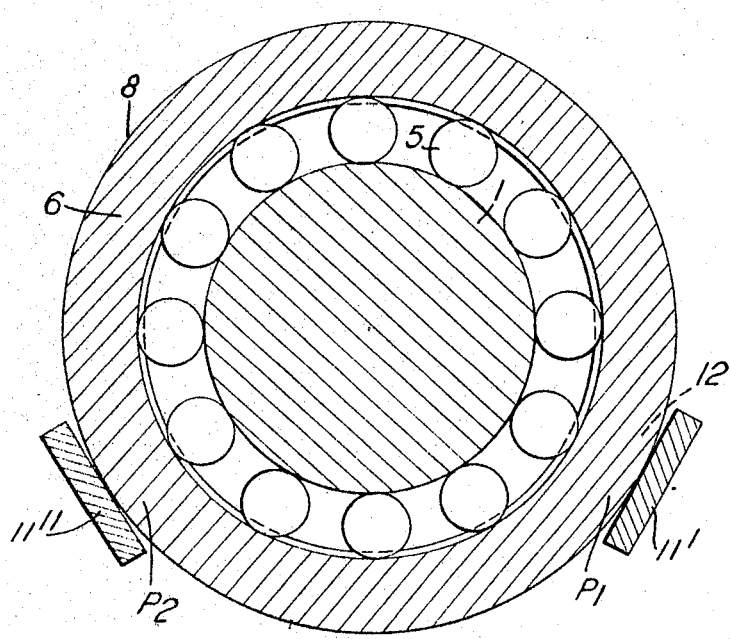

3,463,031
GEARING HAVING TOOTH PRESSURE DISTRIBUTION MEANS
Ivan Charles Lawrence, Long Eaton, and John Kenneth Rhodes, Derby, England, assignors to Rolls-Royce Limited, Derby, England, a British company
Filed Oct. 30, 1967, Ser. No. 679,027
Claims priority, application Great Britain, Nov. 9, 1966, 50,315/66
Int. Cl. F16h 57/00
U.S. Cl. 74—410                                   8 Claims

ABSTRACT OF THE DISCLOSURE

The apparatus comprises two meshing gear wheels one of which is mounted on a rotatable shaft. Bearing means support the shaft and permit limited movement of the shaft in a plane perpendicular to the axis of rotation. Fixed abutment members engage points on the outer periphery of the bearing means so that limited rocking movement of the shaft in a plane about one of the points may take place so that the axes of rotation of the gear wheels may be maintained at a substantially constant distance apart for a predetermined range of relative movement of the gear wheels towards and away from each other.

---

Figure 1:
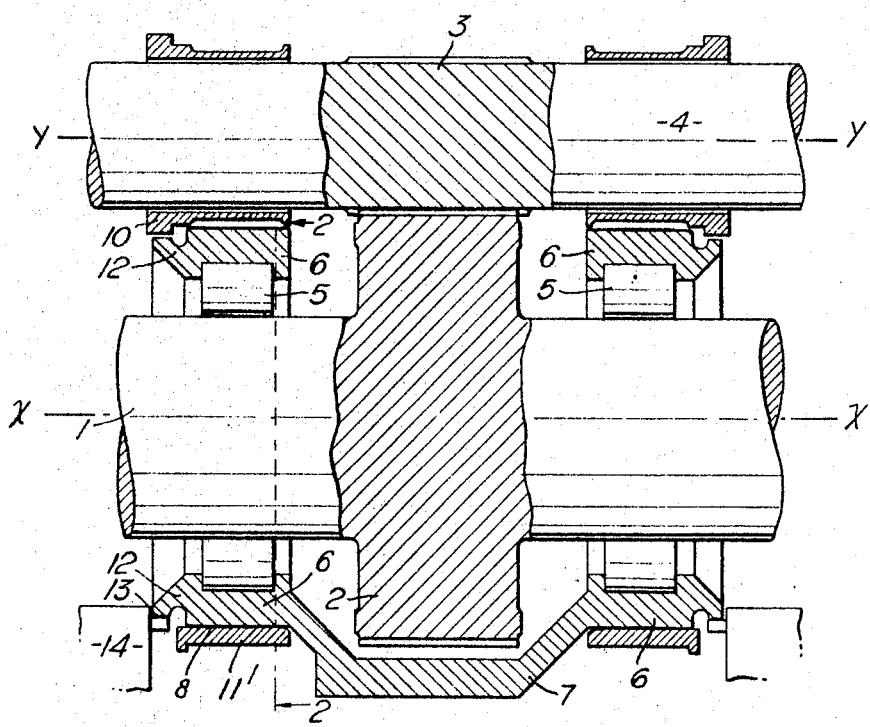

This invention comprises improvements in or relating to gears.

The invention is particularly applicable to gears having teeth of non-involute profile such, for example, as Novikov gears. The term "Novikov gears" as used in this specification is understood to refer to gears in which the gear teeth have the special configuration designed by M. L. Novikov, as described, for example, by H. Walker in "The Engineer," Apr. 29, 1960, pages 725 to 729.

Gears of non-involute profile have a high load-bearing capacity and their application in certain power transmission apparatus is therefore desirable. Since meshing gear teeth in such gears interlock in virtually continuous surface contact, it is essential for practical purposes to maintain the axes of rotation of a pair of meshing gear wheels at a fixed distance apart as any substantial variation in the separation of the axes of rotation of the gear wheels would result in loss efficiency and damage to the gear teeth.

According to the present invention there is provided apparatus comprising two meshing gear wheels, a first rotatable shaft, a first gear wheel mounted on the first shaft, a second rotatable shaft, a second gear wheel mounted on the second shaft, the gear wheels being in meshing engagement, first bearing means supporting the first shaft, second bearing means supporting said second shaft and permitting limited movement thereof in a plane perpendicular to the axis of rotation thereof, and a fixed abutment member engaging the second bearing means, in which the second shaft is mounted, at a point on the outer periphery thereof whereby limited rocking movement of the second shaft in said plane about said point may take place so that the axes of rotation of the gear wheels may be maintained at a substantially constant distance apart for a predetermined range of relative movement of the gear wheels towards and away from each other.

By means of the present invention the axes of rotation of meshing gear wheels may be maintained at a substantially constant distance apart, at least for said predetermined range of relative movement of the gear wheels: usually the said range of relative movement is very small in relation to the diameter of either gear wheel.

Preferably two abutment members are provided which respectively engage said second bearing means in which the second shaft is mounted when the second shaft is rotated in opposite respective directions at respective points which are angularly spaced apart with respect to the axis of rotation of the said second gear wheel at an angle between 90° and 180°. Said angle in a preferred embodiment of the invention is substantially 120°.

In a preferred embodiment the second bearing means has an outer casing which has a cylindrical outer surface, said abutment member engaging said outer surface. Each abutment member may engage the outer casing so as to prevent substantial rotation thereof while permitting said limited rocking movement about said point. Thus the casing may be formed with a nose adjacent to the said point which engages in a corresponding recess provided in a fixed member.

In a preferred embodiment of the invention the second shaft is mounted in bearing means comprising respective roller bearings supporting the shaft on opposite respective sides of the respective second gear wheel.

The invention will be described, merely by way of example, with reference to the accompanying drawings, in which:

FIGURE 1 is a diagrammatic axial section through apparatus according to the invention, and FIGURE 2 is a cross section of part of the apparatus of FIGURE 1 taken on the line 2—2 of FIGURE 1.

The apparatus shown in the drawings comprises a shaft 1 on which a Novikov gear wheel 2 is mounted, the gear wheel 2 being in this case integral with the shaft 1. The gear wheel 2 is provided with axially extending Novikov gear teeth which mesh with corresponding Novikov gear teeth provided on a meshing gear wheel 3. The gear wheel 3 is mounted on, and in this case integral with, a second rotatable shaft 4, having an axis of rotation Y—Y, and mounted in journal bearings 10.

The shaft 1 has an axis of rotation X—X and is rotatably mounted in a pair of identical roller bearings 5 which rotatably support the shaft 1 on opposite respective sides of the gear wheel 2. The roller bearings 5 have respective outer races 6 which are interconnected by a common yoke member 7.

Each bearing outer race 6 has an outer periphery 8 which is engaged by two axially extending abutment members 11', 11" (FIGURE 2) which are arranged to engage the respective outer periphery 8 at two respective points $P_1$, $P_2$ separated in this case by an angle of 120° with respect to the axis of rotation X—X of the shaft 1, when the shaft 1 rotates in opposite respective directions. Thus when the shaft 1 rotates in a clockwise direction (FIGURE 2), the abutment member 11', engages the respective outer periphery 8 at point $P_1$, and when the shaft 1 rotates in a counter-clockwise direction, the abutment member 11" engages the respective outer periphery 8 at point $P_2$.

The bearing outer race 6 is formed with two axially extending projecting noses 12 which are located in respectice recesses 13 (FIGURE 1) provided in a housing 14. The noses 12 are in the same plane as the abutment members 11' and 11". Each recess 13 and nose 12 are so shaped as to prevent the shaft 1 from skewing and also to prevent rotation of the outer race 6 about the axis X—X.

In operation, power is transmitted between the meshing Novikov gear wheels 2, 3. The abutment members 11', 11" are so placed that, with the axes X—X, Y—Y of the gear wheels 2, 3 at their designed working separation, the reaction between the gears 2, 3 (depending on the direction of rotation of the gears) acts directly through one of the abutment members. The other abutment member will thus be unloaded and the shaft will be free to float in a direction perpendicular to the radius between its centre and the loaded abutment member i.e. the shaft is capable of limited rocking movement.

If the gear wheels 2, 3 should move towards or away from each other within a predetermined range of movement, the direction of the reaction between the gears will change rapidly giving rise to an unbalanced moment about one or other of the two abutment members 11', 11" (depending on the direction of rotation of the shaft 1). This moment is such as to cause the dynamic equilibrium to be restored. The effect is seen to be analogous to that of a stiff spring acting on the meshing gear wheels to prevent relative displacement thereof from their designed working positions.

In most practical cases, the amount of relative movement between the meshing gear wheels 2, 3 to be accommodated is very slight, and the arrangement of the present invention is adequate to provide automatic compensation for such movement to maintain the axes of rotation of the gear wheels 2, 3 at a substantially constant distance apart.

Although described with reference to Novikov gears, it will be appreciated that the present invention is applicable in principle to other types of gears having arcuate teeth.

We claim:
1. Apparatus comprising a first rotatable shaft, a first gear wheel mounted on the first shaft, a second rotatable shaft, a second gear wheel mounted on the second shaft, the gear wheels being in meshing engagement, first bearing means supporting the first shaft, second bearing means supporting said second shaft and permitting limited movement thereof, and a fixed abutment member engaging the second bearing means, in which the second shaft is mounted, at a point on the outer periphery thereof whereby limited rocking movement of the second shaft in said plane about said point may take place so that the axes of rotation of the gear wheels may be maintained at a substantially constant distance apart for a predetermined range of relative movement of the gear wheels towards and away from each other.

2. Apparatus as claimed in claim 1 in which the meshing gear wheels are Novikov gears.

3. Apparatus according to claim 1 in which two said abutment members are provided which respectively engage said second bearing means in which the second shaft is mounted when the second shaft is rotated in opposite respective directions at respective points which are angularly spaced apart with respect to the axis of rotation of the said second gear wheel at an angle between 90° and 180°.

4. Apparatus as claimed in claim 3 in which said angle is substantially 120°.

5. Apparatus as claimed in claim 1 in which the second bearing means has an outer casing which has a cylindrical outer surface, said abutment member engaging said outer surface.

6. Apparatus as claimed in claim 5 in which the abutment member engages the outer casing so as to prevent substantial rotation thereof while permitting said limited rocking movement about said point.

7. Apparatus as claimed in claim 6 in which the casing is formed with at least one nose adjacent the said point which engages in at least one corresponding recess provided in a fixed member.

8. Apparatus as claimed in claim 1 in which the second shaft is mounted in bearing means comprising respective roller bearings supporting the second shaft on opposite respective sides of the respective second gear wheel.

References Cited

UNITED STATES PATENTS

| 3,036,475 | 5/1962 | Haupt | 74—410 |
| 3,338,109 | 8/1967 | Forsyth et al. | 74—410 |
| 3,397,591 | 8/1968 | Delescluse | 74—410 |

LEONARD H. GERIN, Primary Examiner